United States Patent
Matsumoto

[11] 3,883,105
[45] May 13, 1975

[54] LOAD HANDLING EQUIPMENT

[76] Inventor: Reizou Matsumoto, 3-63, 4-chome, Imahuku-minami, Johtoh-ku, Osaka, Japan

[22] Filed: June 5, 1974

[21] Appl. No.: 476,415

[52] U.S. Cl. ............... 248/281; 248/123; 248/325; 254/124
[51] Int. Cl. ........................... A47f 5/00; B66d 1/00
[58] Field of Search .................. 248/325, 281, 123; 254/8 R, 124

[56] References Cited
UNITED STATES PATENTS

| | | | |
|---|---|---|---|
| 1,255,185 | 2/1918 | Lehmkuhl | 248/281 |
| 3,153,286 | 10/1964 | Buisson | 248/281 X |
| 3,259,351 | 7/1966 | Olsen | 248/325 |
| 3,259,352 | 7/1966 | Olsen | 248/325 |
| 3,378,231 | 4/1968 | Rapp | 254/124 X |
| 3,472,183 | 10/1969 | Goodman | 254/8 C |
| 3,667,631 | 6/1972 | Bishop | 254/124 X |
| 3,721,416 | 3/1973 | Goudreau | 248/325 |
| 3,747,886 | 7/1973 | Carlson | 248/325 |

*Primary Examiner*—J. Franklin Foss
*Attorney, Agent, or Firm*—Tab T. Thein

[57] ABSTRACT

Load handling equipment having a pantograph comprising two pairs of parallel members, forming a parallelogram intersecting an imaginary line at three points, the first of which is a force point of the output of a ram, the second point of which is a reaction point, and the third point is a suspension point at which a load is suspended, forming a telescopic constant-ratio lever comprising the above three points.

11 Claims, 12 Drawing Figures

LOAD HANDLING EQUIPMENT

This invention relates to an equipment which permits exact mechanical balancing of a load about three axes and which permits the load to be moved as desired with a slight external force and positioned at any point within the effective coverage of the equipment. More prticularly, the invention relates to an improved load handling equipment which realizes a three-dimensional displacement of the load, mechanically balanced by means of a lever which can be freely lengthened and shortened.

U.S. Pat. No. 3,259,351 of July 5, 1966, issued to R. A. Olsen (then assigned to Conco Engineering Works, Inc., in the State of Illinois), titled "Loading Balancer Assembly," relates to a load handling equipment which is on the market and which has drawbacks because of the bending moment on a fluid cylinder by which the load is hoisted or on a bracket which supports the fluid cylinder.

The primary object of the present invention is to arrange plain and simple correlations of gravity of the load suspended at the end of the pantographic lever, of the mechanical force which balances the gravity of the load, and of the reaction force at a reaction point.

Another object of the invention is to distribute properly the bending force at each member of the pantograph by analyzing the reaction forces of the components.

Yet another object of the invention is to utilize the vertical component of motion as a command input of a servo mechanism, independently from options of the load for controlling the position of the latter.

In comparison with the above-mentioned U.S. Patent, in the present invention, the fixed-point pivot construction is eliminated, horizontal movement is provided, and the force point supporting the movement in the direction of gravity corresponds to the two-dimensional displacement of the load.

Therefore, smooth operation is warranted for a long period by eliminating the loss of contraposition at the gravity balance, which has been thought to be inevitable, because the lifting power of the fluid cylinder does not keep line with the reaction of the gravity of the load, and by improving the accuracy of the balance.

Other objects and many of the attendant advantages of the invention will be readily appreciated as the same becomes better understood by reference to the following detailed description, when considered with the accompanying drawings, wherein.

A pantograph constituting two pairs of parallel members is disclosed in which the members intersect an imaginary line A — A, which is a ratio line divided by three intersecting points so that it is always constant, independently from the variety of intersectional angles of the members, as will be explained hereinafter.

For example in FIG. 1, if a first member 1 and a second member 2 of one pair are parallel with each other, while a third member 3 and a fourth member 4 of another pair are also parallel, when three intersecting points 5, 6, 7 are considered, an equality is obtained as follows: $\overline{5-7} / \overline{5-6} = K$, the latter being a constant value to be explained somewhat later.

In the equation, the first point 5 is an intersecting point of line A — A and member 1, the second point 6 is an intersecting point of members 2 and 4, and the third point 7 is an intersecting point of line A — A and member 3. Then, first and fourth members 1, 4 are pivoted at a point 8, first and third members 1, 3 at a point 9, and second and third members 2, 3 at a point 10. The distances between these pivots have the following relations: $\overline{6-8} = \overline{9-10}$; $\overline{8-9} = \overline{6-10}$.

The above relations show that the real lever, comprising the intersecting points 5, 6, 7, is at a location out of the line A — A as a link of the pantograph, and that the effective length of the lever is flexible through an interval ratio of the points 5, 6, 7, and is always constant. That is, the interval ratio between the pivot points 5, 6 against the interval betweeen the pivot points 5, 7 is the constant identified by the above-metioned K.

The displacement relation of these two points is utilized in an ancient diagraph, and in recent years this pantograph is used as a load balancer, as introduced by the earlier-mentioned U.S. Pat. No. 3,259,351. In the balancer assembly on which the patent was issued, the reaction point of the pantographic lever is pivoted to a point which corresponds to the above-defined "point 5;" a load is suspended at a gravity point (herein the "point 7"); the gravity of the load, proportionally converging at a force point (herein "point 6") is balanced by means of the output force of a fluid cylinder at the latter point, thus easy maneuvering is accomplished.

According to this known apparatus, the lifting reaction point loaded at the force point is always displaced because the reaction point is pivoted at that particular point; therefore the lifting reaction point is not always in accord with the lifting force of the fluid cylinder, and accordingly there is a defect in that bending moments are generated at this fluid cylinder or at the bracket supporting the cylinder.

Figures 1, 2:
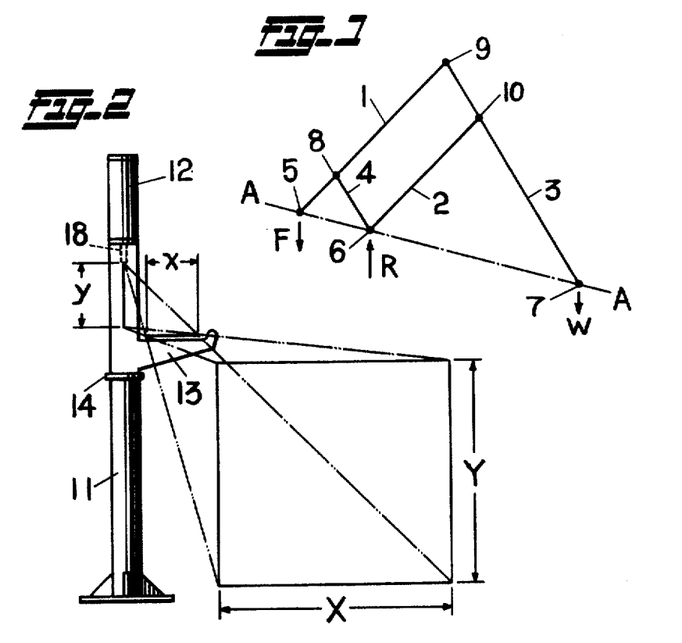
FIG. 1 is a schematic drawing showing a link construction of a pantograph used in the load handling equipment according to the invention.
FIGS. 2 and 3 show correlations of the dimensional displacements of a reaction point and of a force point against the required two-dimemsional displacement of the load in respective practical embodiments of load handling equipment.
Figure 3:
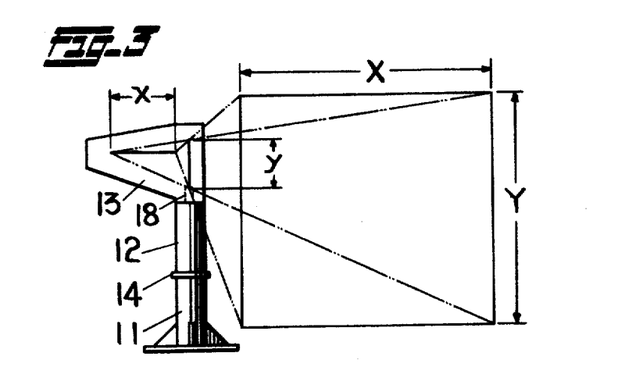

With reference now to FIGS. 2 and 3, but also relative to what was said in regard to FIG. 1, a two-dimensional movement X · Y of a load W is divided into a horizontal displacement (in a x direction) and a vertical displacement (y direction) wherein the first or the second point 5, 6 is a reaction point, and the second or the first point is conversely a force point. That is, if the reaction point 6 of the pantographic lever shown in FIG. 1 is placed on a horizontal guide rail x and the force point 5 is placed on a vertical guide rail y, as shown in FIG. 2, the range of mutual movement at right angles of the reaction and the force points 6, 5, that is, x and y, is composed proportionally to the movement range X · Y of two dimensions of the gravity point of the load.

Furthermore in FIG. 3, wherein the point 5 as a reaction point is permitted to move only in the direction x and the point 6 as a force point is permitted to move only in the y direction, the range of movement of the load is also composed proportionally to X · Y.

In FIG. 2, the force point 5 is pivoted on a ram 18 of an actuator or cylinder 12 mounted on the top of a supporting post 11, and a counterbalancing force F of the ram is $K - 1$ times as large as the gravity of the load W which moves in two-dimensional directions. The displacement of the reaction point 6 toward the x direction is on a bracket 13, and its reaction R is always K times as large as W.

In FIG. 3, the actuator 12 is mounted on the supporting post 11, the point 6 is pivoted to the ram 18, permitting to move vertically y, and the point 5 is slidable in the x direction, thus the following can be formulated:
$K y = Y; (K - 1) x = X$.

The actuator 12 and the bracket 13, having guide rails x, y, are subassembled in one block. Between this and the post 11 of the basic frame a swing apparatus 14 is inserted, to be described hereinafter, so as to be coaxially rotatable.

Figure 4:
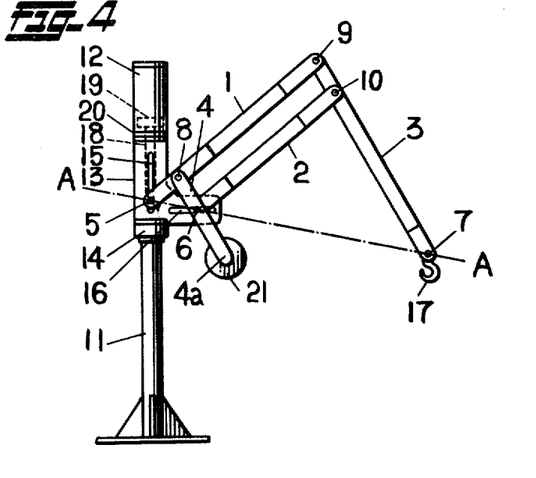
FIGS. 4 and 5 show preferred arrangement applicable to the embodiment of FIG. 2.

FIG. 4 shows a modification of the embodiment shown in FIG. 2, and regarding the four sides of the quadrangle formed by the members 1, 2, 3, 4 of the pantograph, the first member 1 is parallel to the second member 2, and the third member 3 is parallel to the fourth member 4; the first pivot point 5 is on the first member 1, the second point 6 is on the second member 2, and the third point 7 is at the end of the third member 3, and these three points 5, 6, 7 are on the imaginary line A — A as mentioned for FIG. 2.

In this modification, the first point 5 is slidable within a vertical groove 15 provided on the bracket 13, the second point 6 is slidable within a horizontal groove 16 provided also on the bracket 13, and a hook 17 is pivoted to the third point 7 so that the load can be suspended.

The first slidable point 5 is pivoted to the end of the ram 18, and the fluid cylinder, that is the actuator 12, in which a piston 19 connected to the ram 18 is contained, is mounted on the top of the bracket 13 together with a cylinder cover 20 in one block. The bracket 13 is rotatable coaxially at the top of the supporting post 11 by means of the swing apparatus 14.

A balance weight 21 is secured to a point 4a on an extension line of the fourth member 4. As a composite center of gravity of the pantograph members 1 to 4, which transform is located at the right-hand side of the imaginary line A — A, the balance weight 21 is provided in order to bring the composite center of gravity always to the line A — A. Once thus adjusted, the composite center is always kept on line A — A, independent of the transformation of the pantograph or the changes of the inclined angles of the imaginary line A — A. It should be noted that the balance weight 21 is also applicable to other embodiments of the inventive load handling equipment, such as those shown in FIGS. 8 and 9, the arrangement for the latter being shown in the separate illustration of FIG. 10.

Figure 5:
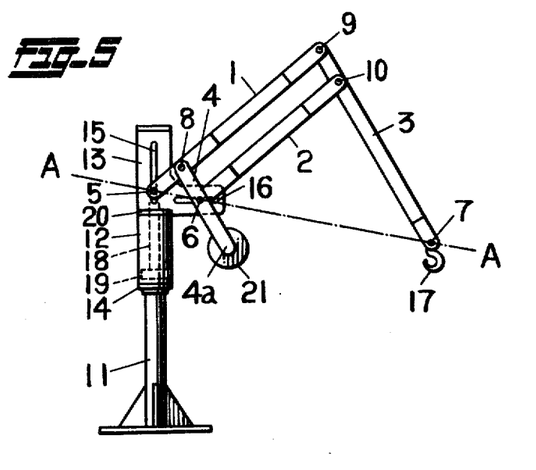

FIG. 5 shows a modification upsetting the fluid cylinder 12 but leaving the bracket 13 at its original position shown in FIG. 4.

Figure 6:
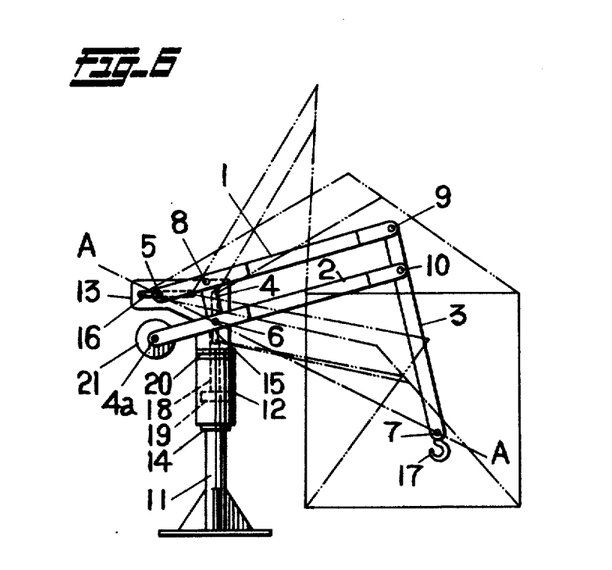
FIG. 6 shows a modification of the embodiment shown in FIG. 3.

FIG. 6 shows a modification of the embodiment shown in FIG. 3. The first pivot point 5 is slidable within the horizontal groove 16 of the bracket 13, the second pivot point 6 is pivoted at the end of the cylinder ram 18, and the cylinder or actuator 12 contains the piston 19 connected to the ram 18.

The bracket 13 and the cover 20 are of a one-block construction and are mounted on the top of the cylinder 12. Therefore the second pivot point 6 is permitted to move in the other vertical groove 15 provided at the bracket 13 by charge and discharge through ports 34 (see FIG. 7), through which compressed air is being introduced, as will be explained somewhat later. Ports 34 are provided under the surface of the piston 19.

The hook 17 is pivoted at the lower end of the third member 3, and as the composite gravity center of the pantograph members 1 to 4 is at the right-hand side of the above-mentioned imaginary straight line A — A in this modification, the balance weight 21 is fixed on an extension line of the second member 2 so that the total composite center of gravity is always kept on the line A — A.

Figure 7:
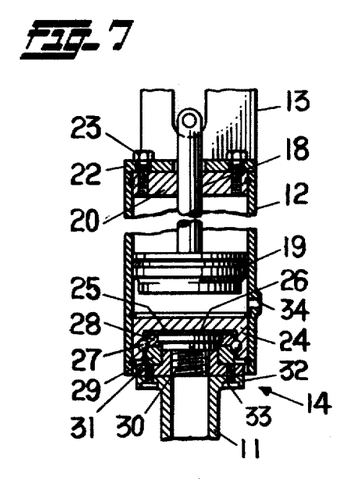
FIG. 7 is a vertical sectional view showing an exemplary swing apparatus for the inventive load handling equipment.

FIG. 7 shows the internal construction of the swing apparatus 14 mounted between the bracket 13 or the fluid cylinder 12 and the post 11. It will be understood by those skilled in the art that the swing apparatus 14 is compatible with all embodiments of the inventive load handling equipment, such as those of FIGS. 2, 3, 6 and 8 to 10. As a matter of example, a schematic indication has been applied to all FIGS. 2 to 6 and 10 (the lower portions of FIGS. 8 and 9 which would show the apparatus having been broken away). The cylinder cover 20 at the end of the fluid cylinder 12 and a flange 22 provided on the bracket 13 are secured by means of bolts 23, and an air-tight cylinder over 24 is inserted at the lower portion of the fluid cylinder. A hollow space 25 is provided at the bottom 26 of cylinder 12 where a ball bearing comprising balls 27 and a race 28, 29 are secured by a bolt 30 and a nut 31, by which the ball bearing is held. By securing a flange 32 to said nut 31 with a screw 33, the fluid cylinder 12, containing the piston 19, and the cylinder ram 18 connected to it, is constructed to be able to turn coaxially on the supporting post 11. The compressed-air input 34 was mentioned earlier.

As mentioned above, in this invention, the load handling equipment in which the displacement of the reaction point is limited to the direction x and the force point is connected to the ram which slides in the direction y, the load W is suspended at the end of the pantograph, each movement of which is limited, and the bracket, having the above-mentioned ram and the guide line x, y turned coaxially around the supporting post, makes it possible to make the two-dimensional movement of the load being composed proportionally out of the movement x, y on the two guide lines, and also makes it possible to make the three-dimensional movement of the load around the axis of the supporting post.

Distinctions and advantages of the present invention over the disclosure of the earlier-discussed U.S. Pat. No. 3,259,351 have been explained in the introduction of this application.

Correct treatment of the bending movement is required, which movement is caused by the gravity of the load at the member of the pantograph used in the equipment. In the pantograph described above, as shown in FIG. 8, the gravity W at the third point 7 plus the counterbalancing force F at the first point 5 are equal to a reaction force R at the middle point. If these three forces are divided into the components of the directions of the first and the second members 1, 2, and the components of the direction of the third and the fourth elements 3, 4, the following equations are obtained: $R = R_1 + R_2$; $F = F_1 + F_2$; $W = W_1 + W_2$, and also the following: $R_1 = F_1 + W_1$; $R_2 = F_2 + W_2$.

Figure 8:
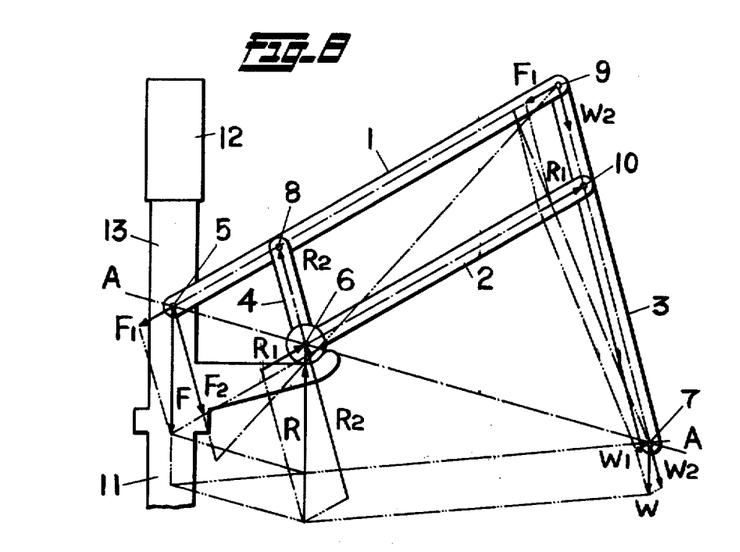
FIG. 8 is a dynamical vector-analyzed drawing of the pantograph for another embodiment of the load handling equipment of the invention.

$F_1$ and $W_1$ produce a reaction force $R_1$ by materializing the bending effect at the third member 3, and $F_2$ and $W_2$ yield the bending effect at the first member 1.

As clarified by the above equations, the outer sides of the first and the third members 1, 3 are in charge of the bending moment, it being understood that each maximum moment is materialized at the pivot points 8 and 10 between the links. As these bending moments are equal to the product of the gravity of the load W at the third point 7 to the horizontal distance from the point 7 to the middle point 8 or 10 of the members 1, 3, it is evident that the moment at the point 8 on the first member 1 is larger than the moment at the point 10 on the third member 3.

Figure 9:
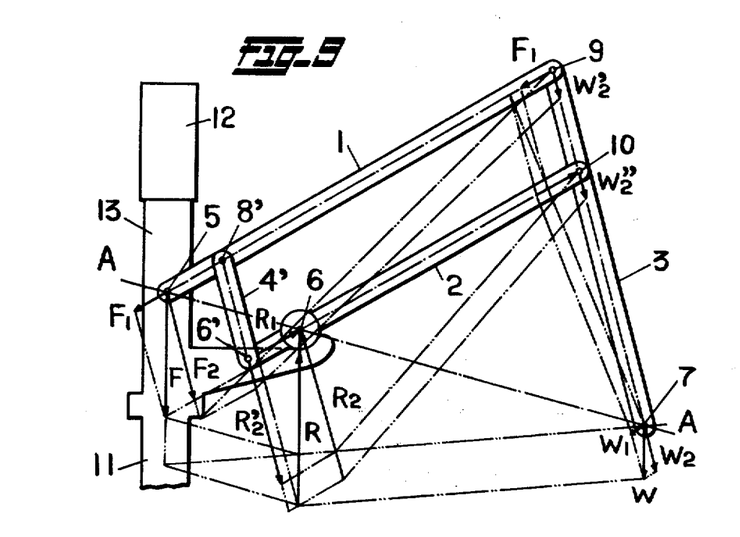
FIG. 9 is a dynamically analyzed drawing of the pantograph adapted to yet another embodiment of the load handling equipment.

In the pantograph of another embodiment of this invention, a member 4', similar to members 4, 4a is linked to the pivot points 6', 8', shifting further to the left from the supporting point 6, as shown in FIG. 9. Thus, the analytical diagraph of the vector changes from FIG. 8 to FIG. 9. For the sake of completeness it might be added that the lower portions of FIGS. 8 and 9 are broken away so as to be able to present them on a larger scale, but it should be understood that the swing apparatus 14 shown in all other figures is fully compatible with these embodiments, as can be seen from FIG. 10 which constitutes a load balancer added to the embodiment of FIG. 9, as will be described somewhat later.

Hence, the above-mentioned $W_2$ is divided into $W'_2$ at the point 9 and $W''_2$ at the point 10, and the following vector equations are obtained: $R_2 = R'_2 + W''_2$; $R'_2 = F_2 + W'_2$.

In the above equations, $R'_2$ replacing $R_2$ is a reaction force at the point 8' on the member 4' having $F_2$ or $W'_2$ as the bending factors, and materializes the maximum moment of the second member 2 at the supporting point 6 by cooperating with $W''_2$.

In the pantograph of the embodiment shown in FIG. 8, the first and the third members 1, 3 are bending members, but in the embodiment shown in FIG. 9, the second member 2 also participates as a bending member.

In this case, the maximum values of the bending moment at the points 6', 8', 10 are made to be equal by locating the points 6', 8' pivoted at both ends of the member 4', namely at the members 1, 2. This value is smaller than the maximum value of the bending moment at the point 8 of the pantograph shown in FIG. 8, and possibly it is reduced to about 40% of the total weight of the members.

Figure 10:
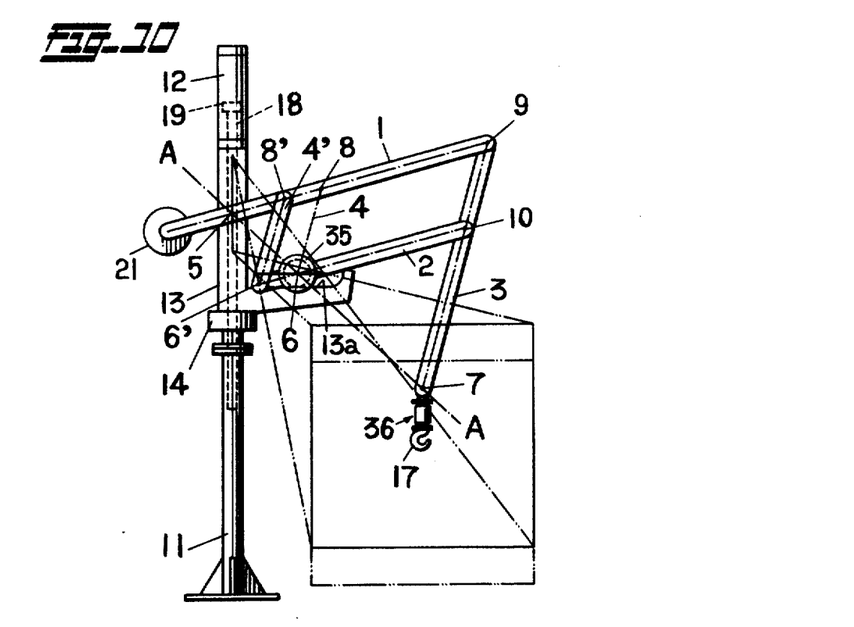
FIG. 10 is a drawing showing an applied load balancer for the pantograph embodiment of FIG. 9.

A modification of the embodiment shown in FIG. 9 is shown in FIG. 10. The fluid cylinder which balances the gravity W of the load, that is, the mechanical actuator or cylinder 12, is made in a one-block construction with the bracket 13. The ram 18 pivoted to the force point 5 of the pantograph is assembled so as to be able to swing coaxially around the shaft of the post 11 by means of the above-mentioned swing apparatus 14, and the movement of the force point 5 is limited to the direction $y$.

Figure 11:
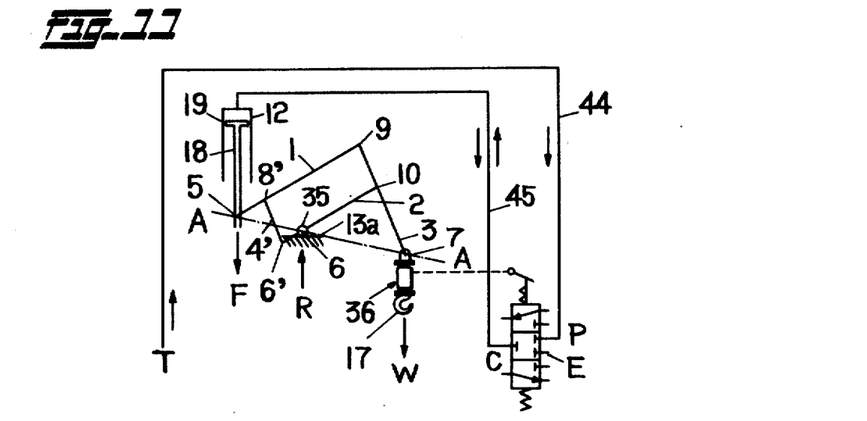
FIG. 11 is a control circuit diagram used in the load handling equipment of the invention.

The supporting point 6 can move in the direction $x$ by means of a roller 35 on a horizontal rail 13a on the bracket 13 (see the control circuit diagram of FIG. 11). The gravity point 7 of the load, together with the above two points, is on the imaginary line A — A and can be displaced in two dimensions in the range within the solid lines, limited by each vertical and horizontal dimensional movement of these two points 5, 6. The load balancing weight 21, added to FIG. 9 to constitute the arrangement of FIG. 10, was described in connection with FIG. 4.

The horizontal and the vertical components of the load displacement are analyzed into the displacement of the respective $x$ and $y$ directions of the supporting point 6 and of the force point 5, respectively. The actuator 12 and the bracket 13 can swing coaxially around the post 11 as one block, so the load W moves in three dimensions. The load is suspended by the hook 17, as mentioned earlier, and a master valve 36 is provided between the hook 17 and one end, at point 7, of the third member 3 (refer again to the circuit of FIG. 11).

Figure 12:
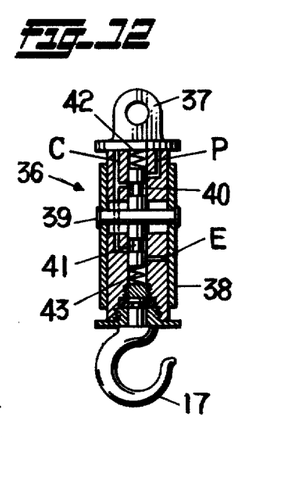
FIG. 12 is a vertical sectional view showing the construction of a master valve used in the control circuit of FIG. 11.

The master valve 36 comprises a body 37 and a sleeve-type grip 38 mounted on the body as shown in FIG. 12, and a pin 39 is inserted into and fixed to the grip in its diametral direction. Two spools 40, 41 are attached to the above, under the pin 39 and under each spool 40, 41, pressed by return springs 42, 43 to keep the grip 38 at its neutral position. Ports P, C, E, respectively connected to an air supply passage 44 from a tank T, to a passage 45 for actuator 12, and finally to the atmosphere, are shown in FIG. 11, shut down by the spools 40, 41.

If the sleeve 38 is moved upwards, when considering FIG. 12, the upper spool 40 also moves upwards, overcoming the tension of the return spring 42, connecting the ports P, C and the air-supply passage 44, and also connecting the passage 45 for the actuator 12, moving the cylinder ram 18 downwards, and then the hook 17 carrying the load moves upwards, corresponding to the movement of the sleeve 38.

If, on the other hand, the sleeve 38 is moved downwards, the lower spool 41 moves downwards, overcoming the tension of the return spring 43, connecting the ports C, E, and the air will be discharged through the passage 45, because the actuator 12 is opened to the exhaust, and the hook 17 carrying the load also moves downwards, corresponding to the movement of the sleeve 38.

If the sleeve 38 is kept stopped at the described position, the neutral position of the valve in this stopped status will shut off the passages 44, 45, and the load will be kept at the stopped position of the sleeve 38.

The FIGS. 4 and 5 (showing reciprocal arrangements of the described actuator 12 above and below the two pairs of parallel pantograph members, with the bracket 13 being respectively disposed below and above the actuator), as well as FIGS. 7, 11 and 12 (swing apparatus 14, overall control circuit, and master valve 36) are to be understood to be applicable to all exemplary embodiments, e.g. those of FIGS. 6, 8, 9 and 10.

In this servo mechanism, among the manual operations by the operator, the vertical components only serve as the displacement of the master valve, while the resultant displacement of the actuator 12 materializes the vertical displacement of the load via the pantograph, as well as feeds back the input displacement of the master valve so as to make it zero.

The only object of the input control is to position the load independently from its size and the change of the size and/or the gravity of the load. That is, in this invention, the load W is displaced to the desired position by the operation of the sleeve 38, unlike the conventional method in which the load is lifted directly or by means of the hook.

In the conventional load handling equipment, for example the assembly of the U.S. Pat. No. 3,259,351, the balance force is adjusted so that the gravity of the load becomes zero by corresponding in advance the balance force of the actuator to the gravity of the load. Then the operation of the load in the non-gravity status is obtained by corresponding the load to its gravity by means of an ON-OFF button; therefore the passages are very complicated, and the operation is rather complex.

The present invention needs no relief valve and needs only the air-supply passage 44 from the tank T and the passage 45 to the actuator 12. Between these passages the master valve 36 is located, therefore the construction is very simple and the operation is easy, as described above.

If the conventional load handling equipment can be said to be a balance-type manual setting system, this invention can be termed to constitute a servo drive-type of direct feedback system.

It should be understood, of course, that the foregoing disclosure relates only to preferred embodiments of the invention, and it is intended to cover all changes and modifications of the examples described which do not constitute departures from the spirit and scope of the invention.

What I claim is:

1. A load handling equipment comprising a pantograph having two pairs of parallel members (1 - 2; 3 - 4, 4a, 4') facing each other and forming a parallelogram; pivotal connections (9; 6, 6'; 8, 8'; 10) between said members, including a first pivot (9) between first ends of a first (1) and a third (3) member, a second pivot (6, 6') at least axially aligned with a second member (2) and the first end of a fourth member (4, 4a, 4'), and third and fourth pivots (8, 8', 10) between respective second ends of said fourth and second members and intermediate points on said first and third members; an imaginary telescopic constant-ratio lever having three predetermined points (5, 6, 7) on the same imaginary line (A — A), of which a first point (5) constitutes a force point, a second point (6) constitutes a reaction point, and a third point (7) constitutes a gravity point where a load (W) is suspended, wherein said first and said second points are selectively a/ at the second end of said first member and b/ at least axially aligned with said second pivot, while c/ said third point is at the second end of said third member; a mechanism including a ram (18) of an actuator (12) connected to balance the load; and a second mechanism including means for limiting the movement of said force point to the vertical direction, means for horizontally moving said reaction point, and means for proportionately deriving a two-dimensional movement for said third point.

2. The load handling equipment as defined in claim 1, wherein said second pivot (6) is between the respective first ends of said second and fourth members (2, 4, 4a, 4'), and coincides with said second point (6) on the imaginary line (A — A).

3. The load handling equipment as defined in claim 1, wherein said second pivot (6') is between an extension line of said second member (2) beyond said second point (6) and said first end of the fourth member (4'), and is outwardly axially aligned with said second point on the imaginary line (A — A) along said second member.

4. The load handling equipment as defined in claim 1, further comprising a supporting post (11) for said mechanisms, a bracket (13) having therein a vertical (15) and a horizontal (16) groove, said actuator (12) being fixed on top of said bracket, the latter being coaxially mounted on said post, and a swing apparatus (14) interposed between said post and said bracket, wherein said limiting means provides for sliding movement of said first point (5) in said vertical groove, and said horizontal moving means provides for movement of said second point (6) in said horizontal groove.

5. The load handling equipment as defined in claim 1, further comprising a supporting post (11) for said mechanisms, a bracket (13) having therein a vertical (15) and a horizontal (16) groove, said bracket being fixed on top of said actuator (12), the latter being coaxially mounted on said post, and a swing apparatus (14) interposed between said post and said actuator, wherein said limiting means provides for sliding movement of said first point (5) in said vertical groove, and said horizontal moving means provides for movement of said second point (6) in said horizontal groove.

6. The load handling equipment as defined in claim 1, further comprising a hook (17) for the load substantially at the free end of said third member (3), a master valve (36) having a feedback system, interposed between said hook and said gravity point (7), said valve including a body (37) and a sleeve-type grip (38), a pin (39) inserted into said grip in its diametral direction, two spools (40, 41) provided within said body, with said pin between them, said spools being pressed by return springs (42, 43) to keep said grip in its neutral position, ports (P, C, E) respectively connected to an air-supply passage (44), to a passage (45) for said actuator (12), and for discharging compressed air, and means to shut off said ports by said spools in the neutral position of said grip.

7. The load handling equipment as defined in claim 1, further comprising a balance weight (21) mounted on an extension of one of said first, second and fourth members (1, 2, 4, 4a, 4').

8. The load handling equipment as defined in claim 3, further comprising a supporting post (11) for said mechanisms, a bracket (13) having therein a vertical (15) and a horizontal (16) groove, said actuator (12) being fixed on top of said bracket, the latter being coaxially mounted on said post, and a swing apparatus (14) interposed between said post and said bracket, wherein said limiting means provides for sliding movement of said first point (5) in said vertical groove, and said horizontal moving means provides for movement of said second point (6) in said horizontal groove.

9. The load handling equipment as defined in claim 3, further comprising a supporting post (11) for said mechanisms, a bracket (13) having therein a vertical (15) and a horizontal (16) groove, said bracket being fixed on top of said actuator (12), the latter being coaxially mounted on said post, and a swing apparatus (14) interposed between said post and said actuator, wherein said limiting means provides for sliding movement of said first point (5) in said vertical groove, and said horizontal moving means provides for movement of said second point (6) in said horizontal groove.

10. The load handling equipment as defined in claim 3, further comprising a hook (17) for the load substantially at the free end of said third member (3), a master valve (36) having a feedback system, interposed between said hook and said gravity point (7), said valve including a body (37) and a sleeve-type grip (38), a pin (39) inserted into said grip in its diametral direction, two spools (40, 41) provided within said body, with said pin between them, said spools being pressed by return springs (42, 43) to keep said grip in its neutral position, ports (P, C, E) respectively connected to an air-supply passage (44), to a passage (45) for said actuator (12), and for discharging compressed air, and means to shut off said ports by said spools in the neutral position of said grip.

11. The load handling equipment as defined in claim 3, further comprising a balance weight (21) mounted on an extension of said first member (1).

* * * * *